(12) United States Patent
Liao et al.

(10) Patent No.: US 6,388,872 B1
(45) Date of Patent: May 14, 2002

(54) PORTABLE COMPUTER WITH COVER AND TORSION MEMBER

(75) Inventors: Reynold L. Liao, Austin; Sean P. O'Neal, Round Rock; Damon Broder, Austin, all of TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/656,568

(22) Filed: Sep. 7, 2000

(51) Int. Cl.[7] ............................................... H05K 5/00
(52) U.S. Cl. .................... 361/683; 361/685; 312/223.2; 70/57
(58) Field of Search ......................... 361/683, 724–727, 361/684–686; 312/223.1–223.6, 351.6, 351.8; 248/556–557; 70/58, 57, 154, 192

(56) References Cited

U.S. PATENT DOCUMENTS

| 5,379,183 A | 1/1995 | Okonsky et al. ............ 361/681 |
| 5,964,599 A | * 10/1999 | Choi ........................... 439/135 |
| 6,226,177 B1 | * 5/2001 | Rude et al. .................. 361/687 |
| 6,304,433 B2 | * 10/2001 | O'Neal et al. .............. 361/681 |

* cited by examiner

Primary Examiner—Leo P. Picard
Assistant Examiner—Hung Van Duong
(74) Attorney, Agent, or Firm—Haynes and Boone, LLP

(57) ABSTRACT

A torsion system for a portable computer including a base and cover pivotally connected to the base for movement between a closed position and an open position. The cover has a free end and a pivotally connected end. A pair of spaced apart hinge components are mounted on the pivotally connected end of the cover between a first side and a second side of the cover. A first frame portion is mounted in the first side of the cover and a second frame portion is mounted in the second side of the cover. A torsion member interconnects the pair of hinge components and the first and second frame portions. The torsion member has a closed cross-section.

20 Claims, 3 Drawing Sheets

PORTABLE COMPUTER WITH COVER AND TORSION MEMBER

BACKGROUND

The disclosures herein relate generally to portable computers and more particularly to a torsion bar connected to hinge brackets mounted in a top portion of a portable computer.

As LCD screens for portable computers increase in size, the thickness and weight that is expected of the portable computers is decreasing. When the user opens or closes the top portion of the portable computer, usually one corner of the top portion is pulled or pushed and pivoted relative to a base portion. The top portion is stiff enough to overcome the friction torque of the hinge on the side that is pulled/pushed. However, the LCD panel mounted in the top portion is not stiff enough to overcome the torque at the hinge on the opposite side of the LCD panel from where the user applied the force. The top portion has a tendency to twist from the torque applied. This twist applies a torque to the LCD panel causing it to twist. A twisted LCD panel can experience various levels of problems such as LCD ripple, i.e. a distorted screen which resembles water ripples, pixels failing due to twisted glass, lines of pixels failing, and customer dissatisfaction.

This has been an issue with portable computers for a long time. There have been two main solutions that have been used to solve this problem including increasing the thickness of the top portion, and using metal brackets which support the top portion. Both of these solutions add thickness and weight to the portable computer. A problem is that these solutions don't address true the problem in the most analytical way; they only attempt to out muscle the torque imposed on the hinges.

In U.S. Pat. No. 5,379,183, the lid portion of a notebook computer is pivotally secured to the base portion of the computer using an elongated metal hinge structure directly interconnected between the lid portion and the metal I/O plate disposed at the back side of the computer base portion and grounded to the system planar board therein. A direct grounding connection is thus formed from the lid portion to the system planar board through this combination I/O plate/lid hinge structure.

Therefore, what is needed is a load bearing apparatus and system that equally distributes load between the separated hinges so that the top portion and LCD panel do not carry the load imposed by a force exerted on one corner of the top portion.

SUMMARY

One embodiment, accordingly, provides a torsion bar extending between the spaced apart hinge brackets. To this end, a portable computer includes a base and a cover pivotally connected to the base for movement between a closed position and an open position, the cover includes a free end and a pivotally connected end. A hinge component includes a first portion and a second portion mounted in the pivotally connected end of the cover between a first side and a second side of the cover, respectively. A torsion member interconnects the first and second portions of the hinge component. The torsion member has a closed cross-section.

A principal advantage of this embodiment is that the torsion bar provides adequate stiffness to the LCD panel and cover without a substantial increase in weight.

BRIEF DESCRIPTION OF THE DRAWING FIGURES

DETAILED DESCRIPTION

Figure 1:
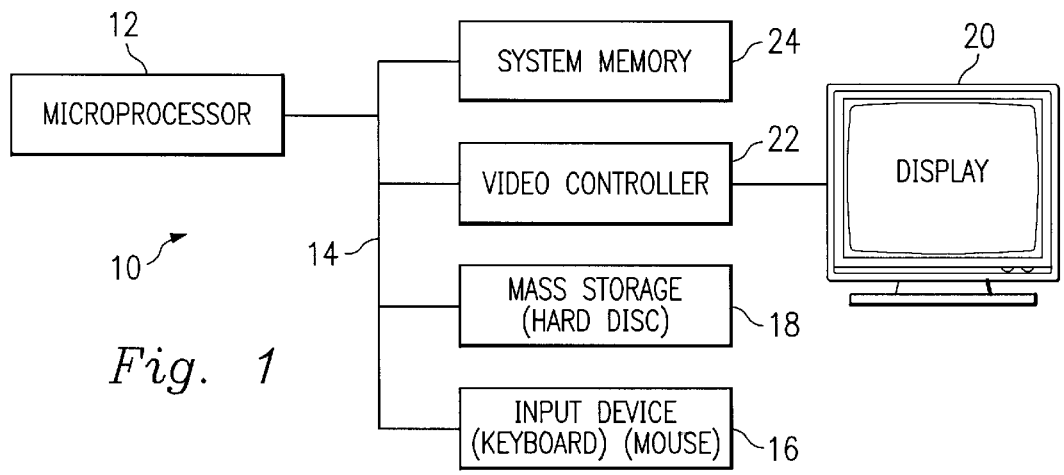
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with a fast storage to facilitate execution of computer programs by microprocessor 12. It should be understood that other busses and intermediate circuits can be deployed between the components described above and microprocessor 12 to facilitate interconnection between the components and the microprocessor.

Figure 2:
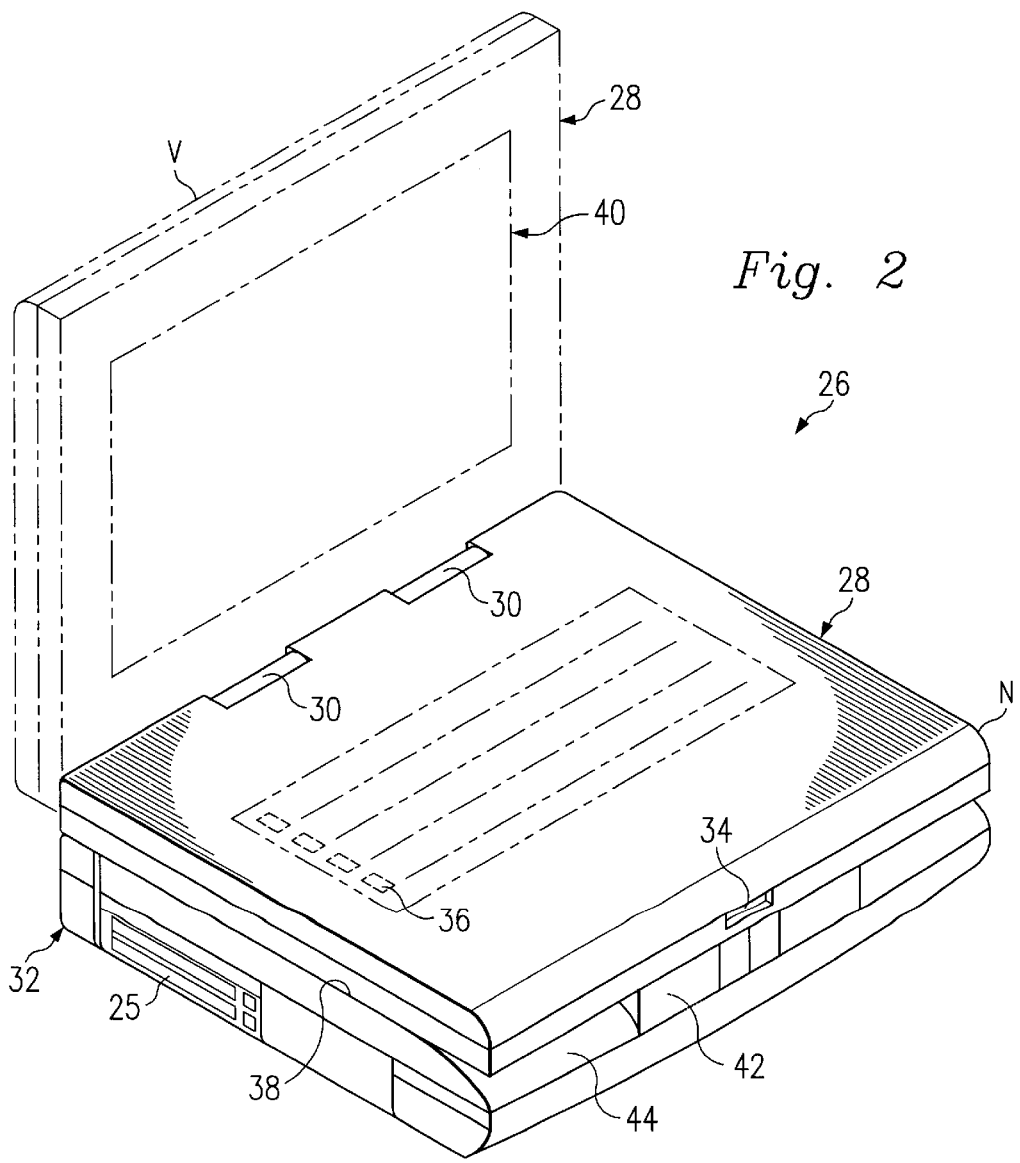
FIG. 2 is a perspective view illustrating an embodiment of a portable notebook computer.

Referring to FIG. 2, illustrated is a portable, notebook size computer designated 26 comprising self-contained computer system 10, described above, and including a hinged top or cover 28 rotatable about a pair of hinge components 30 from a nested position "N", with a horizontal base 32, to a substantially vertical or open position "V". Opening of the notebook style portable computer by manipulation of a latch "V". Opening of the notebook style portable computer by manipulation of a latch 34, reveals a plurality keys 36, illustrated in phantom outline, on a horizontal keyboard surface 38 of base 32, and an LCD display panel 40 in an exposed portion of cover 28. Computer 26 also includes a plurality external ports, an exemplary one of which is designated 25. Base 32 may also include a pointing device 42, such as a track pad, track ball or the like. A palm rest surface 44 is commonly provided adjacent keyboard surface 38.

Figure 3:
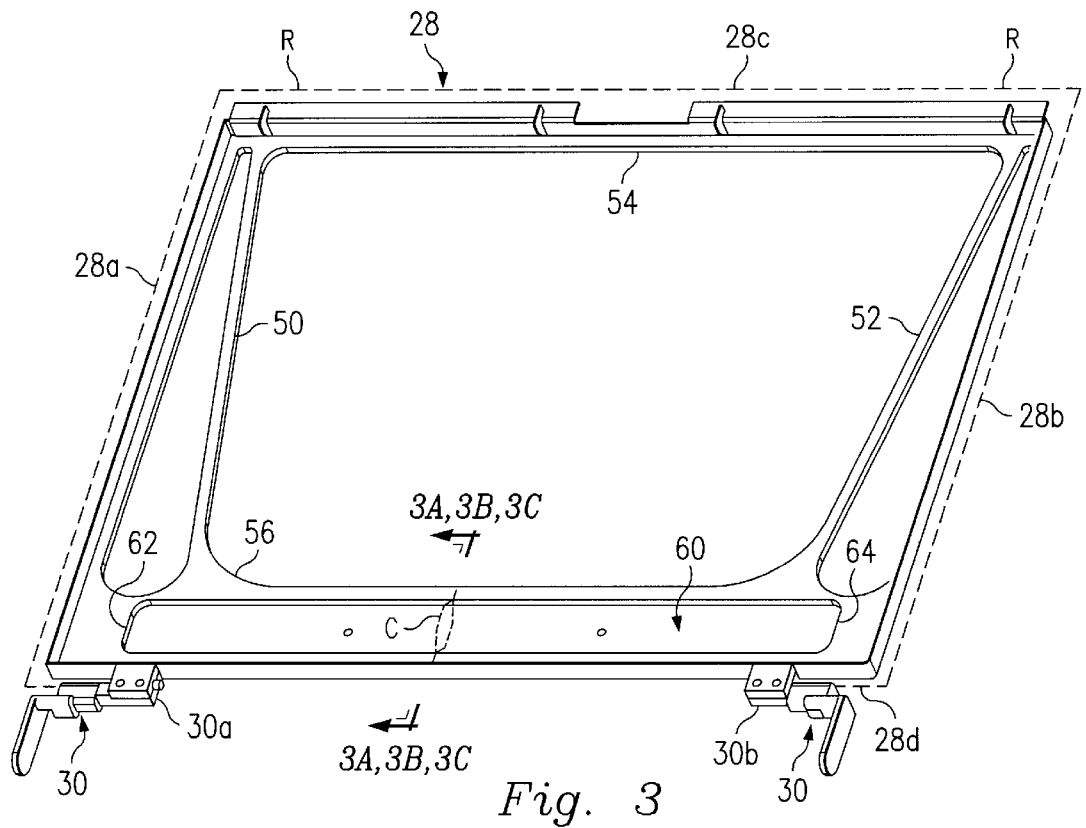
FIG. 3 is a perspective view illustrating an embodiment of a torsion frame in a portable computer cover.

The pair of well-known hinge components 30, FIG. 3, are spaced apart so that one of the components includes a hinge bracket 30a adjacent a first side 28a of cover 28, and the other of the components includes a hinge bracket 30b adjacent a second side 28b of cover 28. Cover 28 also includes a free end 28c and a pivotally connected end 28d, which includes the pair of hinge components 30. It is also contemplated that, instead of two separate hinge brackets 30a, 30b, cover 28 can be pivotally connected to base 32 by a single elongated hinge member or component (not shown) having a first portion mounted adjacent the first side 28a of cover 28, and a second portion mounted adjacent the second side 28b of cover 28 at the pivotally connected end 28d.

A first frame portion 50 is mounted in cover 28 and extends along the first side 28a of cover 28. A second frame portion 52 is mounted in cover 28 and extends along the second side 28b of cover 28. The first and second frame portions 50, 52, respectively, may be stamped light weight sheet metal members suitably attached to cover 28 by welding or riveting. Alternatively, a one-piece metal frame may be provided. A first span member 54 may extend along the free end 28c of cover 28 and interconnect frame portions 50, 52. Also, a second span member 56 may extend along the pivotally connected end 28d of cover 28. However, first and second span members 54, 56, respectively, are not required, as is discussed below.

A torsion member 60 extends along the pivotally connected end 28d of cover 28. Torsion member 60 includes a first end 62 and a second end 64. First end 62 is adjacent first side 28a of cover 28, and second end 64 is adjacent second side 28b of cover 28. First end 62 of torsion member 60, is attached to hinge bracket 30a and is also attached to first frame portion 50. Second end 64 of torsion member 60, is attached to hinge bracket 30b and is also attached to second frame portion 52.

Figure 3A:
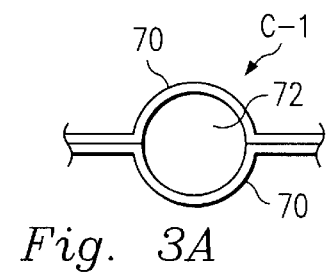
FIGS. 3A–3C are cross-sectional views illustrating various cross-sectional embodiments of a torsion bar taken along the line 3A, 3B, 3C–3A, 3B, 3C of FIG. 3.
Figure 3B:
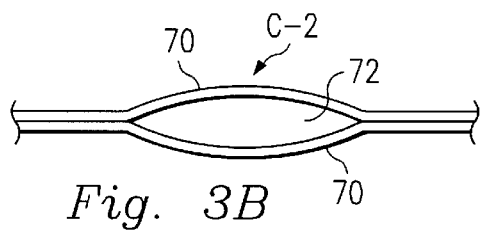
Figure 3C:
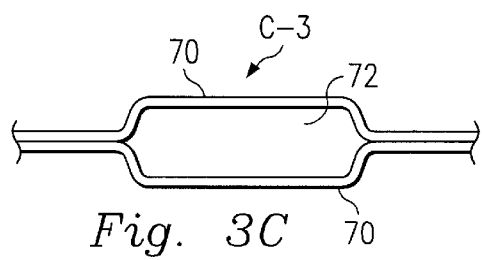

Torsion member 60 has a closed cross-section C. The cross-section C may be of a substantially circular configuration C-1, FIG. 3A, a substantially oval configuration C-2, FIG. 3B, or a substantially rectangular cross-section C-3, FIG. 3B. In either closed cross-section configuration C-1, C-2 or C-3, there exists the presence of elongated opposed wall portions 70 and a space 72 therebetween. These configurations provide stiffness without adding substantial weight. The torsion member 60 may be formed of the same material used to form the frame portions 50 and 52.

Figure 4:
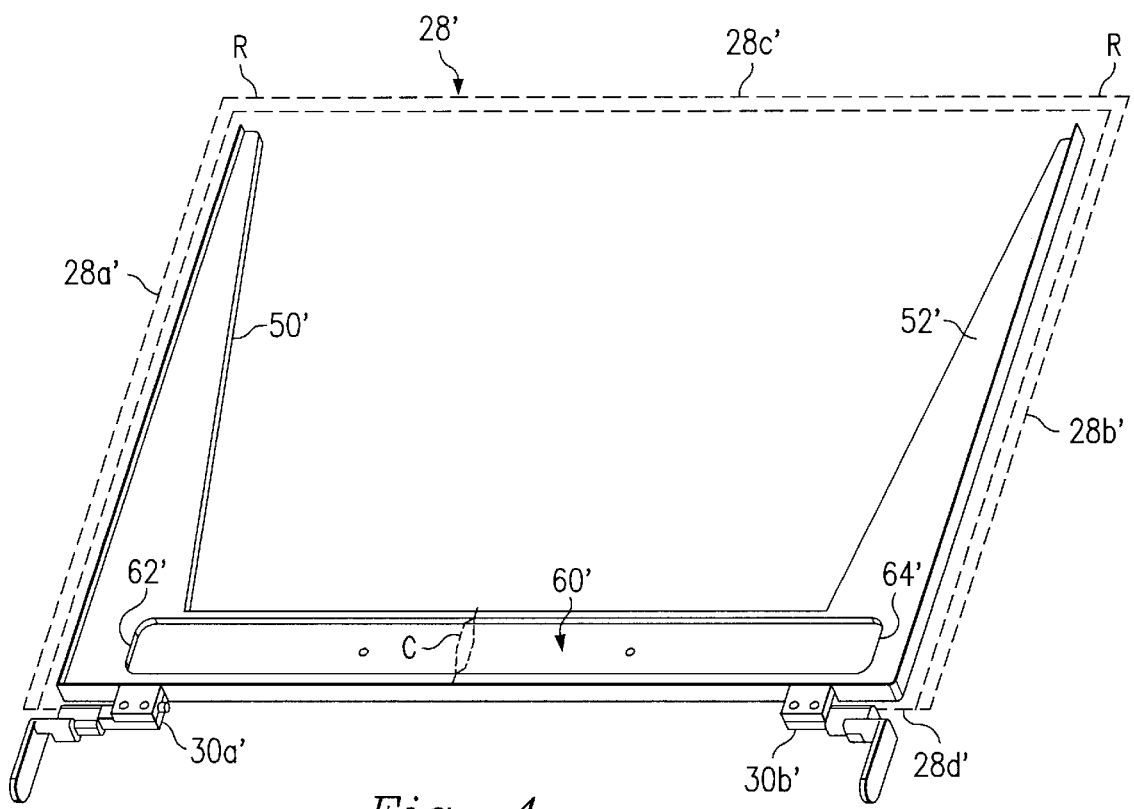
FIG. 4 is a perspective view illustrating another embodiment of a torsion frame in a portable computer cover.

In an alternative embodiment, FIG. 4, a first frame member 50' is mounted in a cover 28' and extends along a first side 28a' of cover 28'. A second frame portion 52' is mounted in cover 28' and extends along a second side 28b' of cover 28'. A torsion member 60' extends along a pivotally connected end 28d' of cover 28'. Torsion member 60' includes a first end 62' and a second end 64'. First end 62' is adjacent first side 28a'of cover 28', and second end 64' is adjacent second side 28b' of cover 28'. First end 62'of torsion member 60' is attached to a hinge bracket 30a' and is also attached to frame portion 50'. Second end 64' of torsion member 60', is attached to a hinge bracket 30b'and is also attached to second frame portion 52'. Thus, a substantially U-shaped assembly is formed by frame members 50' and 52', attached to torsion member 60'.

In operation, although the first and second span members 54, 56, respectively, may be provided, the essential elements required include the first frame portion 50 connected to the second frame portion 52 by the torsion member 60, such that the torsion member 60 is also connected to the hinge brackets 30a and 30b, see FIG. 3. This provides a torsion assembly which carries a load along a line, extending from either corner R adjacent the free end 28c, along the respective frame portion 50 or 52, to the respective hinge bracket 30a, or 30b, along the torsion member 60 adjacent the pivotally connected end 28d, to the other hinge bracket 30a or 30b.

As a result, one embodiment provides a portable computer including a base and a cover pivotally connected to the base for movement between a closed position and an open position. The cover has a free end and a pivotally connected end. A hinge component includes a first portion and a second potion mounted on the pivotally connected end of the cover between a first side and a second side of the cover. A torsion member interconnects the first and second portions of the hinge component. The torsion member has a closed cross-section.

Another embodiment provides a torsion system for a portable computer including a base and a cover pivotally connected to the base for movement between a closed position and an open position. The cover has a free end and a pivotally connected end. A pair of spaced apart hinge components are mounted on the pivotally connected end of the cover between a first side and a second side of the cover. A first frame portion is mounted in the first side of the cover and a second frame portion is mounted in the second side of the cover. A torsion member interconnects the pair of hinge components and the first and second frame portions. The torsion member has a closed cross-section.

A further embodiment provides a computer system including a base. A microprocessor is mounted in the base. An input is coupled to provide input to the microprocessor. A storage is coupled to the microprocessor. A display is coupled to provide storage to facilitate execution of computer programs by the microprocessor. A cover housing the display is pivotally connected to the base for movement between a closed position and an open position. The cover has a free end and a pivotally connected end. A hinge component has a first portion and a second portion mounted on the pivotally connected end of the cover between a first side and a second side of the cover. A torsion member interconnects the first and second portions of the hinge component. The torsion member has a closed cross-section.

As it can be seen, the principal advantages of these embodiments are that a torsion bar is added to between the spaced apart hinge brackets. This increases the torque carrying capability of the LCD panel and cover. When the user opens or closes the cover by moving the corner of the cover, the load is carried through the hinge bracket on that side. The load is then carried across the torsion bar to the friction hinge of the opposite side of the cover. The cover and LCD panel do not carry a major portion of the load. As a result, there is very little relative motion of the two hinge brackets.

The torsion bar is preferably made of sheet metal such as the same stock material as the hinge brackets, and may be welded to the brackets. If constructed as one piece, embossing can be used to increase stiffness across the LCD panel and cover. This solution has several advantages including minimizing the weight needed to provide a stiff LCD panel and cover assembly. If the thickness must be increased for the stiffness, the thickness could be added in the hinge area only of the LCD panel and cover assembly.

Although illustrative embodiments have been shown and described, a wide range of modification change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A portable computer comprising:

a base;

cover pivotally connected to the base for movement between a closed position and an open position, the cover having a free end and a pivotally connected end;

a hinge component having a first portion and a second portion mounted on the pivotally connected end of the cover between a first side and a second side of the cover respectively; and a torsion member interconnecting the first and second portions of the hinge component, the torsion member having a closed cross-section.

2. The computer as defined in claim 1 further including:

a first frame member mounted on the first side of the cover; and a second frame member mounted on the second side of the cover.

3. The computer as defined in claim 2 wherein the torsion member interconnects the first and second frame members.

4. The computer as defined in claim 3 wherein the torsion member has a substantially circular cross-section.

5. The computer as defined in claim 3 wherein the torsion member has a substantially oval cross-section.

6. The computer as defined in claim 3 wherein the torsion member has a substantially rectangular cross-section.

7. The computer as defined in claim 1 wherein the first and second portions of the hinge component are hinge brackets.

8. A torsion system for a portable computer comprising:

a base;

a cover pivotally connected to the base for movement between a closed position and an open position, the cover having a free end and a pivotally connected end;

a pair of spaced apart hinge components mounted on the pivotally connected end of the cover between a first side and a second side of the cover;

a first frame portion mounted in the first side of the cover;

a second frame portion mounted in the second side of the cover; and a torsion member interconnecting the pair of hinge components and the first and second frame portions, the torsion member having a closed cross-section.

9. The system as defined in claim 8 wherein the torsion member has a substantially circular cross-section.

10. The system as defined in claim 8 wherein the torsion member has a substantially oval cross-section.

11. The system as defined in claim 8 wherein the torsion member has a substantially rectangular cross-section.

12. The system as defined in claim 8 wherein the hinge components are hinge brackets.

13. The system as defined in claim 8 wherein the first and second frame portions and the torsion member form a generally U-shaped torsion assembly.

14. A computer system comprising:

a base;

a microprocessor mounted in the base;

an input coupled to provide input to the microprocessor;

a storage coupled to the microprocessor;

a video controller coupled to the microprocessor;

a memory coupled to provide storage to facilitate execution of computer programs by the microprocessor;

a cover housing the display, the cover being pivotally connected to the base for movement between a closed position and an open position, the cover having a free end and a pivotally connected end;

a hinge component having a first portion and a second portion mounted on the pivotally connected end of the cover between a first side and a second side of the cover, respectively; and a torsion member interconnecting the first and second portions of the hinge component, the torsion member having a closed cross-section.

15. The computer as defined in claim 14 further including:

a first frame member mounted on the first side of the cover; and a second frame member mounted on the second side of the cover.

16. The computer as defined in claim 15 wherein the torsion member interconnects the first and second frame members.

17. The computer as defined in claim 16 wherein the torsion member has a substantially circular cross-section.

18. The computer as defined in claim 16 wherein the torsion member has a substantially oval cross-section.

19. The computer as defined in claim 16 wherein the torsion member has a substantially rectangular cross-section.

20. The computer as defined in claim 14 wherein the first and second portions of the hinge component are hinge brackets.

* * * * *